United States Patent

Walker

[15] 3,699,636
[45] Oct. 24, 1972

[54] METAL BONDING PROCESS
[72] Inventor: Gerard F. Walker, Hudson, Mass.
[73] Assignee: Whittaker Corporation
[22] Filed: Feb. 17, 1971
[21] Appl. No.: 115,964

[52] U.S. Cl..................29/432, 29/470.1, 29/497.5, 29/505, 287/20.3, 287/189.36 B
[51] Int. Cl..........................B23p 11/00, B23k 21/00
[58] Field of Search..........29/432, 432.1, 470.1, 505, 29/497.5; 228/3; 287/20.3, 189.36 B

[56] References Cited

UNITED STATES PATENTS

| | | | |
|---|---|---|---|
| 2,236,288 | 3/1941 | Engle et al. | 29/432 UX |
| 2,514,976 | 7/1950 | Stivin | 29/432 UX |
| 2,751,808 | 6/1956 | Mac Donald et al. | 29/470.1 X |
| 2,936,478 | 5/1960 | Hegji | 29/432 UX |
| 3,191,276 | 6/1965 | Gwyn | 29/470.1 X |
| 3,367,020 | 2/1968 | Watson | 29/432 X |

Primary Examiner—Charlie T. Moon
Attorney—Donald E. Nist and Jay H. Quartz

[57] ABSTRACT

A method for pressure bonding metals of differing hardness to each other comprising mechanically forcing a shaped end of a harder metal member in tubular form into a flat-faced, chamfered end of a solid member of softer metal. The shaped end of the tubular member is formed by externally tapering one end of the tubular member to provide the latter with, preferably, two consecutive, intersecting tapered surfaces extending and tapering from the outer to the inner surface of the tubular member and defining an internally included angle of less than 180°. Each tapered surface is tapered between about 5° and about 45° with respect to the longitudinal axis of the tubular member. The chamfered end of the solid member is formed by tapering the side wall adjacent one end of the latter between about 5° and about 30° with respect to the longitudinal axis of the solid member. The internal diameter of the tubular member is less than the width of the chamfered end of the solid member.

7 Claims, 7 Drawing Figures

PATENTED OCT 24 1972 3,699,636
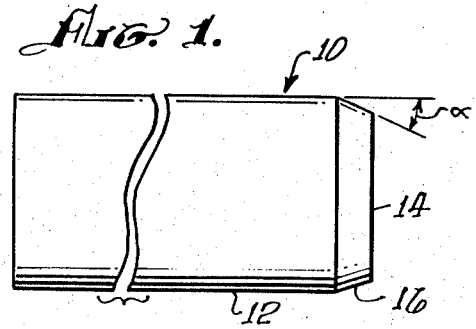
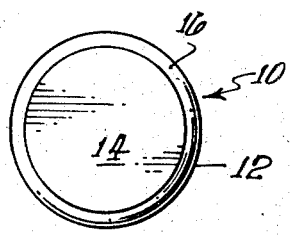
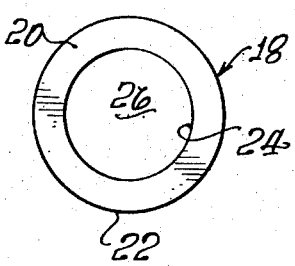
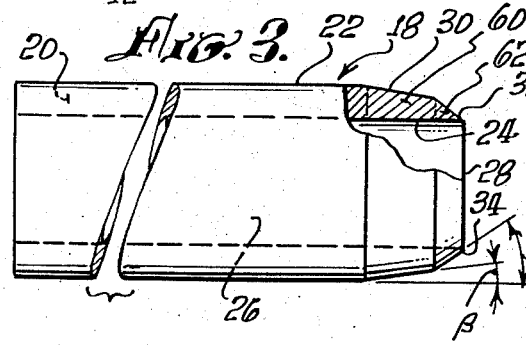
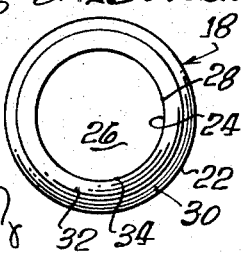
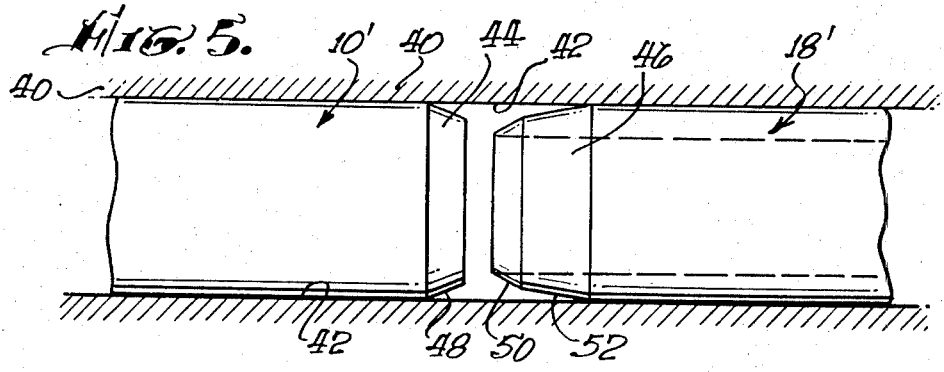
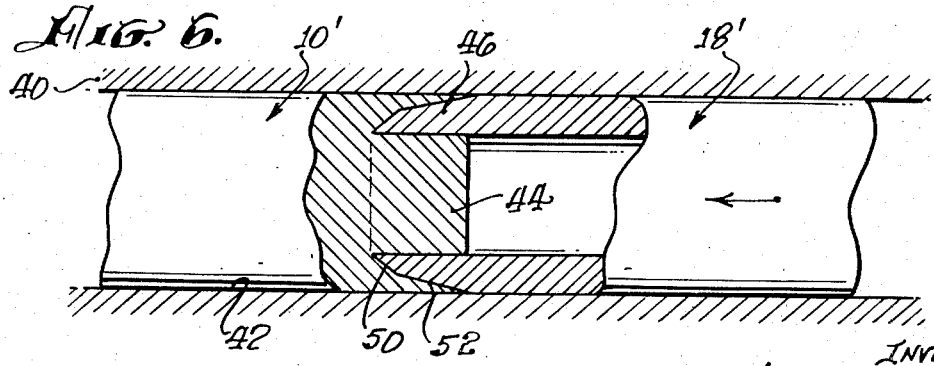
INVENTOR
GERARD H. WALKER,
By Donald E. Nist
E. Jay H. Quartz    ATTORNEYS

METAL BONDING PROCESS

BACKGROUND OF THE INVENTION

This invention relates to pressure bonding of metals.

Various techniques are presently available for bonding metal members together. These include welding, brazing and pressure bonding. The latter method is particularly useful for bonding metals which cannot be welded or brazed and for bonding metals which form bond-weakening oxides or intermetallic compounds at the bond line when brazed or welded. However, good pressure bonding requires that the surfaces to be bonded be clean and oxygen-free during bonding to prevent the formation of inclusions between the bonding surfaces which can greatly weaken the bond.

At present, various techniques are employed to clean and polish the surfaces to be bonded to expose clean surfaces for bonding. For example, U.S. Pat. No. 2,751,808, issued June 26, 1956 to R. J. MacDonald et al describes a method for explosively driving a bullet-shaped stud into a host surface. To ensure bonding between the stud and host material, the stud is polished to an extremely smooth finish. Such polishing is expensive and time consuming. Even then, there is a substantial chance that the polished surface will oxidize unless used in a relatively short time or unless coated with a protective coating. These limitations, of course, result in further expense if a protective coating is applied. If a coating is not applied, the studs have to be re-polished if not used in a short time. Use in a short time is difficult in most commercial operations.

Although the surfaces to be bonded are cleaned and/or polished before bonding, this alone is no guarantee that bonding will not be hindered by the presence of oxygen. Presently-employed pressure bonding techniques employ generally bullet-shaped members to penetrate flat surfaces. During such penetration, the flat surface is usually at least partially depressed or "folded" inwardly by the bullet-shaped member so that the latter is at least partially surrounded by the depressed flat surface with its oxide coating. This again results in a weak bond.

SUMMARY OF THE INVENTION

This invention comprises a method of pressure bonding a pair of shaped members of which one is a solid cylinder of relatively soft metal and the other is a tube of relatively hard metal. The two members are telescoped together with the telescoping end of each member being provided with an external, annular taper extending from its circumferential side wall to its forward surface so that the solid cylinder is left with a flat telescoping end of reduced diameter and so that the tube is given a sharply-defined, annular penetrating edge.

The angle of taper for each member is critical and varies between about 5° and about 30° with respect to its longitudinal axis for the solid cylinder and varies between about 5° and about 45° with respect to its longitudinal axis for the tube with the tube taper preferably comprising a pair of surfaces angled at different degrees to its longitudinal axis.

Under suitable pressure in a tubular retainer, the shaped or sharpened end of the tube is forced to penetrate the flat, reduced-diameter face of the solid cylinder. Penetration is accomplished by a cutting of the flat face of the solid cylinder by the penetrating edge of the tube. That is, the flat face of the solid cylinder is not depressed or folded inwardly. This cutting or shearing action of the tube exposes clean solid-cylinder metal for bonding with the tube metal.

One advantage of this method is that clean metal is always exposed within the solid cylinder by the shearing action of the tube and, thus, a superior bond can be obtained. Additionally, since the clean metal of the solid cylinder is not exposed until the latter is penetrated by the tube, no precautions need be taken to preserve a clean finish on the solid cylinder.

A further advantage of this method is that the components can be machined on automatic machines with attendant lower costs since there are no critical dimensions to be held. That is, within the aforementioned angle ranges, the particular angles selected do not have to be exactly machined to obtain improved bonding.

DESCRIPTION OF THE DRAWINGS

FIG. 1 is a side elevational view of a solid cylinder employed as one of the components of this invention.

FIG. 2 is an end view of the chamfered end of the solid cylinder of FIG. 1.

FIG. 3 is a side elevational view of tube employed as the other component of this invention.

FIG. 4a is an end elevational view of the tapered end of the tube of FIG. 3.

FIG. 4b is an end elevational view of the other end of the tube of FIG. 3.

FIG. 5 is a side elevational view in partial section of a cylindrical retainer housing the components shown in FIG. 1 and FIG. 3 prior to telescoping them together.

FIG. 6 is the same view as in FIG. 5 except that the solid cylinder and tube are shown telescoped together.

DESCRIPTION OF THE PREFERRED EMBODIMENT

Referring now to the Figures, and particularly to FIGS. 1 and 2, the numeral 10 designates a solid cylinder having a side wall 12 and an end wall 14 substantially perpendicular thereto. The portion of the side wall 12 adjacent the end wall 14 is chamfered to provide a chamfered, annular surface 16 which extends between the side and end walls 12, 14, respectively, to intersect and interconnect the latter surfaces.

The chamfer angle $\alpha$ which the chamfered surface 16 makes with respect to the side wall 12 (and the longitudinal axis of the solid cylinder 10) varies between about 5° and about 30°. Below about 5°, a poor bond results because there is generally insufficient material to extrude around the outside of the member employed to penetrate the end wall 14. Above about 30°, the force required to telescope the cylinder 10 and other metal member together increases substantially so that it becomes impractical to use significantly larger angles. That is, above about 30°, it becomes very difficult to move the metal, which forms the solid cylinder 10 and which lies adjacent the chamfered surface 16, radially outwardly to fill the annular void volume about the chamfered surface produced by chamfering. The value within this range for the angle $\alpha$ employed in a particular application will depend upon the hardness of the material forming the cylinder 10, the dimensions and hardness of the member to be bonded to the cylinder 10, the pressure available for the bonding operation and the temperature of the components in the bonding operation.

The member to be bonded to the cylinder 10 is shown in FIGS. 3 and 4 (a) and (b) and is designated by the numeral 18. The member 18 is tubular and comprises an annular wall 20 having an outer surface 22 and an inner surface 24 defining a bore 26. The outer surface 22 adjacent one end 28 of the tubular member 18 (hereafter "the penetrating end") is tapered to form, preferably, two consecutive tapered surfaces 30,32 which extend from the outer surface 22 to the inner surface 24 to provide the tube 18 with a circular, knife-like edge 34.

The first tapered surface 30 forms an angle $\beta$ with the outer surface 22 (and with the longitudinal axis of the tube 18) and the second tapered surface 32 forms an angle $\gamma$ also with the outer surface so that the angle $\beta$ is included within the angle $\gamma$. The larger angle $\gamma$ must not exceed about 45° with respect to the longitudinal axis of the tube 18. Above about 45°, the penetrating effect is substantially the same as if the penetrating end 28 of the tubular member 18 was flat. That is, instead of cutting into the solid cylinder 10 to cause a shearing of the penetrated metal (as is the case when $\gamma$ is less than about 45°), the penetrating end 28 would merely depress the flat surface 14 of the solid cylinder inwardly thereby leaving oxidized metal of the solid cylinder 10 in contact with the penetrating end 28 of the tube 18 which would result in a weak bond between solid cylinder and tube. Since the angle $\beta$ is included in the angle $\gamma$, except when they are equal in the single taper case, it follows that the angle $\beta$ has an upper limit of less than about 45° with respect to the longitudinal axis of the tube 18.

The angle $\beta$ must be at least about 5°. Below about 5°, even with the angle $\gamma$ added thereto, the length of the tapered surface 30 becomes impractically long. The lower limit for the angle $\gamma$ is also 5° as explained hereafter.

The purpose of employing a doubly-tapered tube, as opposed to a singly-tapered tube, is to insure that contact exists between the tube 18 and solid cylinder 10 along substantially the entire penetrating length of the tube 18. That is, if voids exist within the solid cylinder 10 adjacent the penetrating end 28 of the tube 18, the bond between tube and solid cylinder is substantially weakened with the result that the product will not be commercially acceptable. Such voids occur when the penetrating end of a tube is forced radially outwardly from the tube's longitudinal axis as it penetrates a solid cylinder. When this occurs, the leading edge of the penetrating end of a tube tends to curl under and back on itself so that cylinder metal is prevented from coming into contact with the under or trailing side of the leading edge, thereby producing a void and non-bonded area. This can and does occur when the penetrating end of a tube has only a single taper (except as described hereafter) or when a double taper is employed but when the taper extends outwardly from the inner to the outer surface opposite to that shown in FIG. 3. The aforementioned exception exists when using a single taper with tubes having an inside diameter of less than about 0.25 inches since their compactness apparently prevents the leading edge from being forced radially outwardly.

To ensure that voids are not formed, the described double taper is employed with the cutting edge formed by the intersection of the tube's inner surface 24 and the leading tapered surface 32. The internally included angle formed by the intersection of the tapered surfaces 30,32 must not be greater than 180° and is only equal to 180° (the single taper case) when using tubes having the aforedescribed small inner diameters. That is, the angle $\gamma$ is always larger than the angle $\beta$ except for the aforementioned single taper case. Therefore, the doubly-tapered end of the tube 18 always has a generally convex curvature as shown in FIG. 3. Because of this internally included angle limitation, the lower limit for the angle $\gamma$ is the same as that of the angle $\beta$, i.e., about 5°, for the aforementioned small diameter tubes and is greater than about 5° for larger diameter tubing.

The trailing annular section 60 partially defined by the trailing tapered surface 30 and the inner tube surface 24 primarily exists to provide rigidity to the penetrating end 28 although its taper, of course, facilitates penetration of the solid cylinder 10 by the tube 18. The function of the leading annular section 62 defined by the tube inner surface 24 and by the leading tapered surface 32 is to ensure that the cutting edge 34 is not bent outwardly. Because of the convex inward taper of the tapered surfaces 30,32, the leading section 62 is caused to penetrate straight into the solid cylinder 10 or to bend slightly radially inwardly as it penetrates the solid cylinder 10 in spite of the normal tendency of the core of the solid cylinder to force it outwardly. The same void formation and non-bending as described in connection with outward curling of the penetrating end 28 could occur if the latter was bent severely inwardly toward the solid cylinder axis. This does not occur when practicing the herein-described invention because of the use of the previously-described ranges for the angles $\beta$ and $\gamma$. By bending inwardly when penetrating the solid cylinder 10, the penetrating end 28 of the tube 18 is, of course, prevented from extending outwardly through the side wall 12 of the solid cylinder. Such penetration of the side wall 12 of the cylinder 10 can occur if the cutting edge 34 is defined by the tube outer surface 22 and the leading tapered surface 32 (not shown) or when a single tapered surface is employed (using tubes having I.D.'s greater than about 0.25 inches).

The herein-described invention has particular utility for joining metals having differing stiffness characteristics such that they are not co-extrudable at the temperature selected to perform this method although it is to be understood that materials which are co-extrudable can be joined by this method. That is, although two metals may be co-extrudable at a first temperature, they may not be co-extrudable at a second temperature. The solid cylinder 10 and tube 18 may be heated to that second temperature and readily joined according to this invention. Additionally, it is often preferable to selectively heat one component. For example, the solid member 10 may be heated (thereby softening it) and the tubular or penetrating member may be maintained at ambient temperature.

As used herein and in the claims, the term "metal" includes pure metals as well as alloys. Examples of combinations joinable by the herein-described method include: aluminum and stainless steel; aluminum and Kovar (iron-nickel-cobalt alloys); zirconium and stainless steel; and magnesium and stainless steel.

Of the pair of metals to be joined in a particular application, the softer metal forms the solid cylinder 10 and the harder metal forms the tube 18. By employing the materials in this manner, penetration of the softer material is assured without breaking the penetrating edge of the tube.

The method of this invention will now be further described with reference to FIGS. 5 and 6 in which the numeral 40 designates a cylindrical retainer having a bore 42 into which a solid cylinder 10' and a tube 18' are slidably inserted so that their shaped ends 44,46, respectively, are in confronting or opposing relation. The shaped ends 44,46 are provided with tapered surfaces 48 and 50,52, respectively, angled with respect to the longitudinal axes of the solid cylinder 10' and tube 18' as previously described taking into account the metals forming the solid cylinder and tube and their respective dimensions.

By techniques which are well-known in the pressure bonding art, the shaped ends 44,46 of the solid cylinder 10' and tube 18' are telescoped into each other so that the tube 18' penetrates into the solid cylinder 10'. As the tube 18' penetrates into the solid cylinder 10', peripheral material adjacent the tapered surface 48 of the latter is forced radially outwardly to fill the initially-unfilled portion of the retainer bore 42 surrounding the shaped ends 44,46 of the solid cylinder and tube. The amount of solid cylinder metal thus forced radially outwardly is greater than the aforementioned initially-unfilled portion of the retainer bore 42 thereby resulting in complete filling of the latter and extrusion of the solid cylinder metal to conform to the retainer bore 42. Also, as the shaped end 46 of the tube 18' penetrates the solid cylinder 10', some of the solid cylinder material is forced into the bore 26' of the tube as shown in FIG. 6.

To ensure that a tube will readily penetrate a given solid cylinder so that the metal of the latter will be caused to substantially completely surround the tube's penetrating end in bonding contact therewith, the components are selected so that the tube inner diameter is less than the reduced diameter or width of the chamfered end of the solid cylinder, i.e., less than the diameter of the end surface 14 of the solid cylinder 10 of FIGS. 1 and 2. The difference in size between the reduced end surface of a solid cylinder and the internal diameter of a tube is dependent upon the materials forming the solid cylinder and tube. However, it has been found that the tube I.D. should be between about 0.050 in. and about 0.100 in. less than the reduced end surface diameter. Above about 0.100 in. difference, there is too much solid cylinder material to be pushed radially outwardly around the penetrating end of the tube to avoid point bending, void formation and poor bonding. Below about 0.050 in., there is insufficient material to completely and fully envelop the penetrating end of the tube.

The cutting or shearing action of the tube 18' as it penetrates the solid cylinder 10' exposes clean, nonoxidized surfaces within the latter to the tube. Thus, the tube is pressure bonded directly to virginal solid cylinder material to provide a strong bond.

If the metals forming the solid cylinder 10' and tube 18' are co-extrudable at ambient temperature, they may be heated to a temperature at which they are not co-extrudable (if such a temperature exists) while inserted in the retainer 40 and then pressure bonded at that temperature.

A pair of tubes may be joined together by joining each to opposite ends of the same solid cylinder by the method of this invention so that the latter forms an intermediate plug between the two tubes. The plug, of course, could be machined out to the same bore diameter as the tubes after joinder.

This invention has been described with respect to the use of components having cylindrical shapes, i.e., circular cross-sections. However, this not a requirement and components having, for example, rectangular cross-sections may be used.

We claim:

1. A method for interbonding metallic members comprising the steps of:
    shaping a solid first metallic member having a side wall and an end wall to provide said first metallic member with an annular tapered surface extending from said side wall to said end wall at an angle with respect to the longitudinal axis of said first metallic member between about 5° and about 30°, said end wall being left with a width after said shaping;
    shaping a tubular second metallic member having an external and an internal wall and formed from a metal which is at least as hard as the metal forming said first metallic member, to provide said second metallic member with a first and a second annular, externally-tapered surface extending from said external wall to said internal wall, respectively, to form a cutting edge, each of said first and said second tapered surfaces disposed at an angle between about 5° and about 45° with respect to the longitudinal axis of said second metallic member, said angle formed by said second tapered surface being larger than said angle formed by said first tapered surface, said second metallic member having a bore smaller than said width of said end wall of said first metallic member; and
    mechanically forcing said cutting edge of said second metallic member into said first end wall of said first metallic member to interbond said first and second metallic members.

2. The method of claim 1 in which said first and said second metallic members are tubular, said cutting edge of said second metallic member being circular and having a diameter less than the diameter of said end wall of said first metallic member after said shaping.

3. The method of claim 2 wherein said diameter of said circular cutting edge is less than about 0.25 in. in diameter and said first and said second tapered surfaces are tapered at the same angle with respect to said longitudinal axis of said second metallic member to form a single tapered surface.

4. The method of claim 1 wherein said first and said second metallic members are not co-extrudable at ambient temperatures.

5. The method of claim 1 wherein said step of mechanically forcing said cutting edge of said second metallic member into said end wall of said first metallic member is conducted at an elevated temperature at which said first and said second metallic members are not codextrudable.

6. The method of claim 1 wherein said bore is smaller than said width by an amount between about 0.05 in. and about 0.1 in.

7. A method interbonding metallic members, comprising the steps of:
   shaping a solid metallic cylinder having a side wall and an end wall to provide said solid cylinder with an annular tapered surface extending from said side wall to said end wall at an angle between about 5° and about 30° with respect to the longitudinal axis of said solid cylinder to leave said end wall with a diameter;
   shaping a metallic cylindrical tube having an outer and an inner wall and formed from a metal which is at least as hard as the metal forming said solid cylinder to provide said tube with a first and a second annular, externally-tapered surface extending from said outer wall to said inner wall, respectively, to form a circular cutting edge having a diameter less than said diameter of said end wall of said solid cylinder by an amount between about 0.05 in. and about 0.1 in., said first and said second tapered surfaces disposed at angles $\beta$ and $\gamma$, respectively, with respect to the longitudinal axis of said tube, said angle $\beta$ being at least about 5° and said angle $\gamma$ being not greater than about 45° and being larger than said angle $\beta$; and
   mechanically forcing said cutting edge of said tube into said first end wall of said solid cylinder to interbond said tube and said solid cylinder.

* * * * *